(12) United States Patent
Josten et al.

(10) Patent No.: US 6,878,891 B1
(45) Date of Patent: Apr. 12, 2005

(54) SWITCHGEAR ENCLOSURE

(75) Inventors: Harry W. Josten, Grapevine, TX (US); Joshua Raker, Lewisville, TX (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 0 days.

(21) Appl. No.: 10/699,972

(22) Filed: Nov. 3, 2003

(51) Int. Cl.[7] .......................... H01H 9/02; B65D 6/28; H02B 1/01; H02B 11/127

(52) U.S. Cl. ................ 200/293; 200/50.13; 200/50.17; 200/50.21; 220/4.02; 361/606; 361/724; 361/832; 312/223.1

(58) Field of Search .......................... 200/50.01–50.04; D13/152, 154; 361/605, 606, 615, 616, 724–727, 832; 220/4.02; 174/50–67; 312/223.1, 291

(56) References Cited

U.S. PATENT DOCUMENTS

| 3,983,460 | A | * | 9/1976 | Kuhn et al. | 200/50.21 X |
|---|---|---|---|---|---|
| 4,650,085 | A | | 3/1987 | Davies et al. | 220/4 |
| 4,860,161 | A | * | 8/1989 | Maki et al. | 361/615 X |
| 5,147,981 | A | | 9/1992 | Buet et al. | 174/52.1 |
| 5,193,049 | A | | 3/1993 | Jackson | 361/379 |
| D367,267 | S | | 2/1996 | McGione et al. | D13/164 |
| D375,938 | S | | 11/1996 | Muller et al. | D13/152 |
| 5,689,097 | A | | 11/1997 | Aufermann et al. | 218/157 |
| 5,803,803 | A | | 9/1998 | O'Dell et al. | 454/184 |
| 5,855,290 | A | | 1/1999 | Fahey et al. | 220/4.28 |
| 5,892,195 | A | | 4/1999 | Aufermann et al. | 218/157 |
| 5,901,868 | A | | 5/1999 | Fahey et al. | 220/4.02 |
| 5,903,438 | A | | 5/1999 | Deschamps et al. | 361/736 |
| 6,467,640 | B1 | | 10/2002 | Hung | 220/4.02 |

* cited by examiner

Primary Examiner—James R. Scott
(74) Attorney, Agent, or Firm—Foley & Lardner LLP

(57) ABSTRACT

A method and a door arrangement for a switchgear enclosure, with the enclosure having a top and bottom panel, a back panel and two opposing side panels. The enclosure includes an interior framework supporting a draw-out circuit breaker. The door arrangement comprises a front extension coupled to the enclosure. An exterior door is pivotably mounted in an offset position to the front extension and configured to move from one of a closed position and an open position on one side of the enclosure. The breaker door is pivotably mounted to the interior framework and configured to move from one of a closed position and an open position on another side of the enclosure and move clear of the offset exterior door.

19 Claims, 3 Drawing Sheets

SWITCHGEAR ENCLOSURE

BACKGROUND OF THE INVENTION

The present invention relates generally to enclosures for switchgear, panel boards, circuit breakers, and more particularly to a non-walk-in enclosure for low voltage switchgear and switchboard assemblies.

Switchgear and switchboard are general terms which cover metal enclosures, housing switching and interrupting devices such as fuses, circuit breakers, relays along with associated control, instrumentation and metering devices. The enclosures also typically include devices such as bus bars, inner connections and supporting structures used for the distribution of electrical power. Such metal enclosures can be maintained in a building such as a factory or commercial establishment, or they can be maintained outside of such facilities and exposed to environmental weather conditions. Typically, hinge doors or covers are provided on the front of the switchgear or switchboard sections for access to the devices contained therein.

Low voltage switchgear and switchboards operate at voltages up to 600 volts and continuous currents that can exceed 5000 amps. It is also possible that in short circuit conditions, intermittent currents exceeding 100,000 amps are possible.

When metal enclosures are used out of doors, switchgear and switchboard assemblies are typically housed in NEMA type 3R enclosures. Previous non-walk-in enclosures had the exterior doors closed over the circuit breaker doors and sealed against the indoor switchgear frame when the frame was wider than the circuit breaker doors. Other enclosures had the door sealed against a spacer that was used in the same plane as the front of the switchgear frame when the circuit breaker doors and the frame are nominally the same width. The spacer was needed to provide a sealing surface for the exterior door. Such prior art spacers are typically approximately two inches wide and are placed between each section of switchgear and switchboards. Such spacers add cost and proliferates parts to accommodate the added width of the enclosure. Conventional enclosure designs also lack space between the circuit breaker door and the exterior door of the enclosure thereby preventing a draw-out type circuit breaker from being placed in a disconnected position with the exterior door of the enclosure closed. In a situation where the enclosure is housed inside of a building, the additional width requirement takes up additional space.

Thus, there is a need for a non-walk-in enclosure for low voltage switchgear and switchboard assemblies that does not require the additional width of spacers between sections. There is a further need for an enclosure that will accommodate circuit breaker compartment doors that are nominally the same width as the sections in which the circuit breakers are housed. There is an additional need for an enclosure to allow the exterior doors to be closed when an enclosed circuit breaker is in a disconnected position.

SUMMARY OF THE INVENTION

There is provided a door arrangement for a switchgear enclosure, with the enclosure having a top and bottom panel, a back panel and two opposing side panels. The enclosure includes an interior framework supporting a draw-out circuit breaker. The door arrangement comprises a front extension coupled to the enclosure. An exterior door is pivotably mounted to the front extension at an offset exterior door frame post and configured to move from one of a closed position and an open position on one side of the enclosure and move clear of the offset exterior door frame post. A breaker door is pivotably mounted to the interior framework and configured to move from one of a closed position and an open position on another side of the enclosure. Another embodiment provides that the front extension allows the exterior door to be closed when the circuit breaker is in a disconnected position.

There is further provided a switchgear enclosure for a draw-out circuit breaker. The enclosure comprises the structure having a top panel coupled to a bottom panel with a back panel coupled to opposing side panels defining an interior space. A framework is mounted in the interior space of the structure and configured to support a circuit breaker. A front extension is coupled to the structure. An exterior door is pivotably mounted to the front extension at an offset exterior door frame post and configured to move from one of a closed position and an open position on one side of the structure and move clear of the offset exterior door frame post. A breaker door is pivotably mounted to the interior framework and configured to move from one of a closed position and an open position on another side of the structure.

There is also provided a method of housing a circuit breaker. The method comprises the steps of providing an enclosure defining an interior space. Providing a framework configured to support the circuit breaker. Mounting the framework in the interior space. Providing a front extension and coupling the front extension to the enclosure. Providing an offset exterior door frame post. Providing an exterior door configured to move from one of a closed position and an open position. Mounting the exterior door on the offset exterior door frame post at one side of the enclosure. Providing a breaker door configured to move from one of a closed position and an open position. Mounting the breaker door on another side of the enclosure and mounting the circuit breaker in the framework.

DETAILED DESCRIPTION OF THE EXEMPLARY EMBODIMENTS

Figure 1:
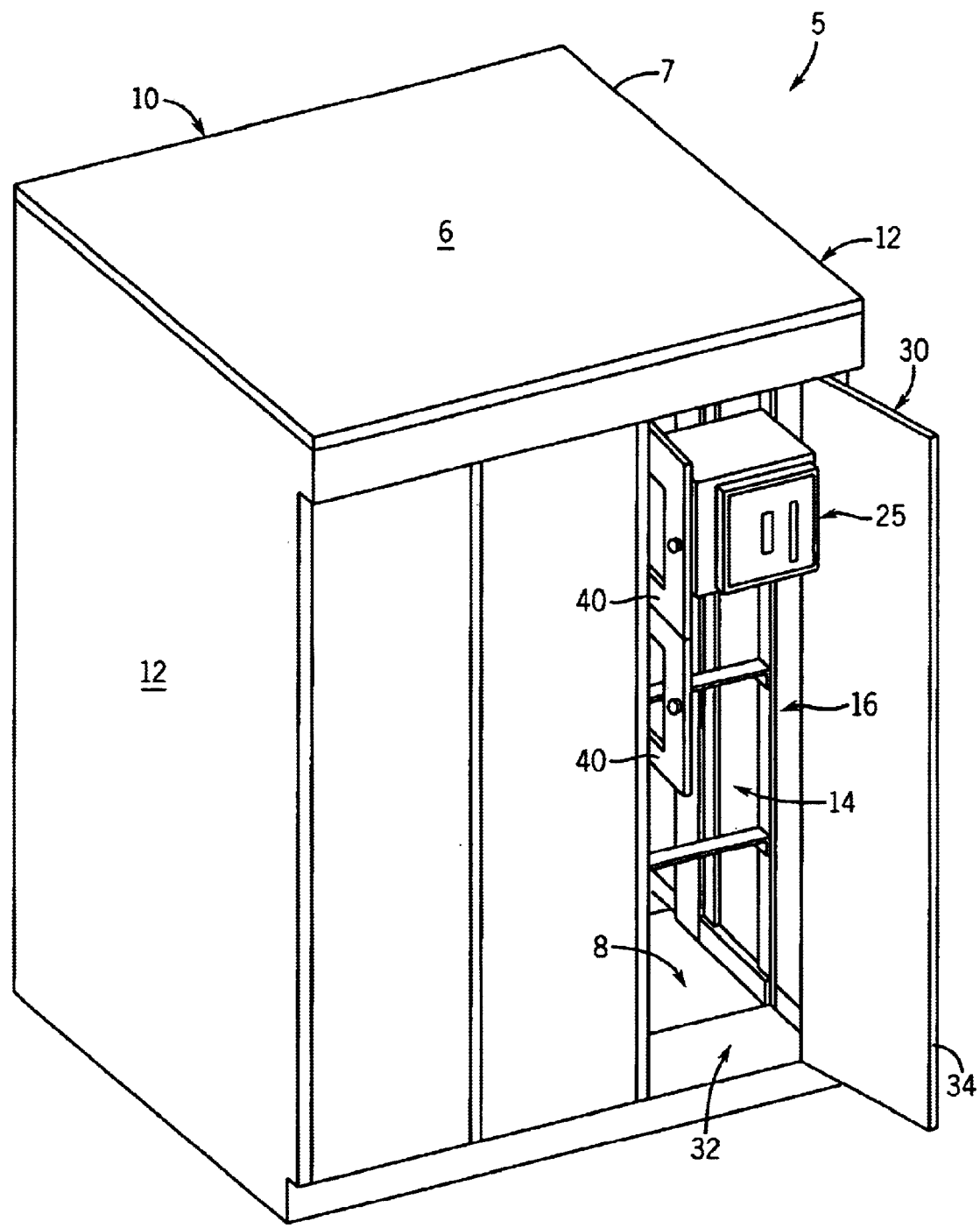
FIG. 1 is a perspective view of an enclosure defining an interior space and including a framework supporting a circuit breaker, with the enclosure including a front extension and an exemplary embodiment of a door arrangement.
Figure 2:
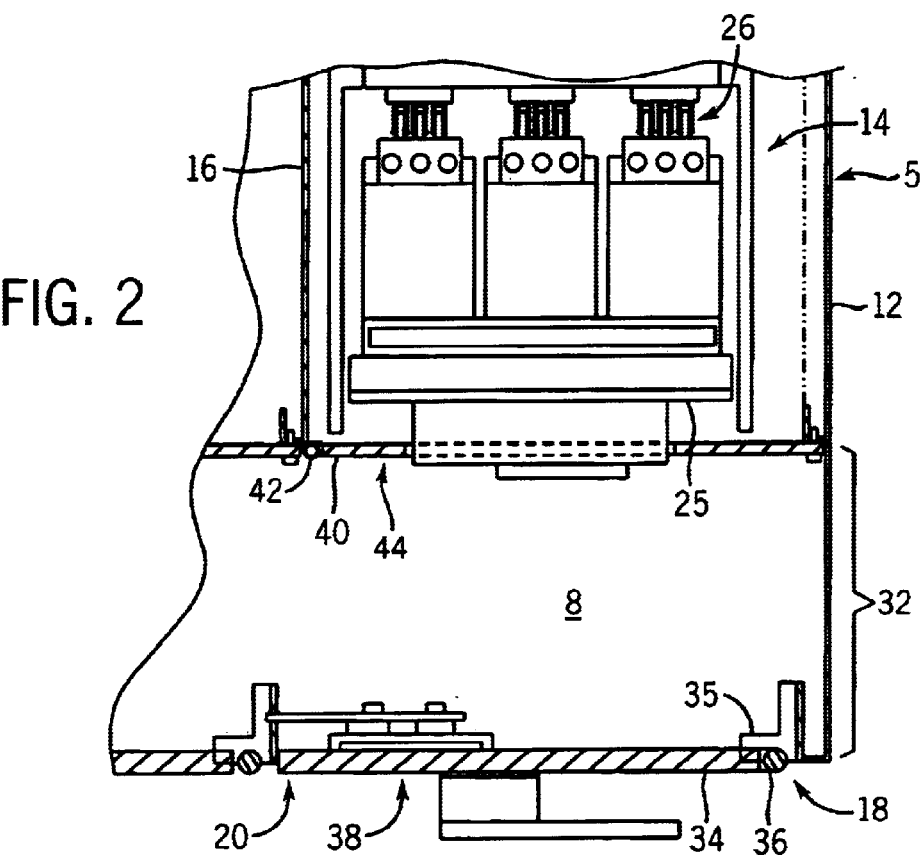
FIG. 2 is a partial sectional top view of an exemplary embodiment of an enclosure having a front extension and a circuit breaker in a connected position with a circuit breaker door in a closed position and an exterior door in a closed position.
Figure 3:
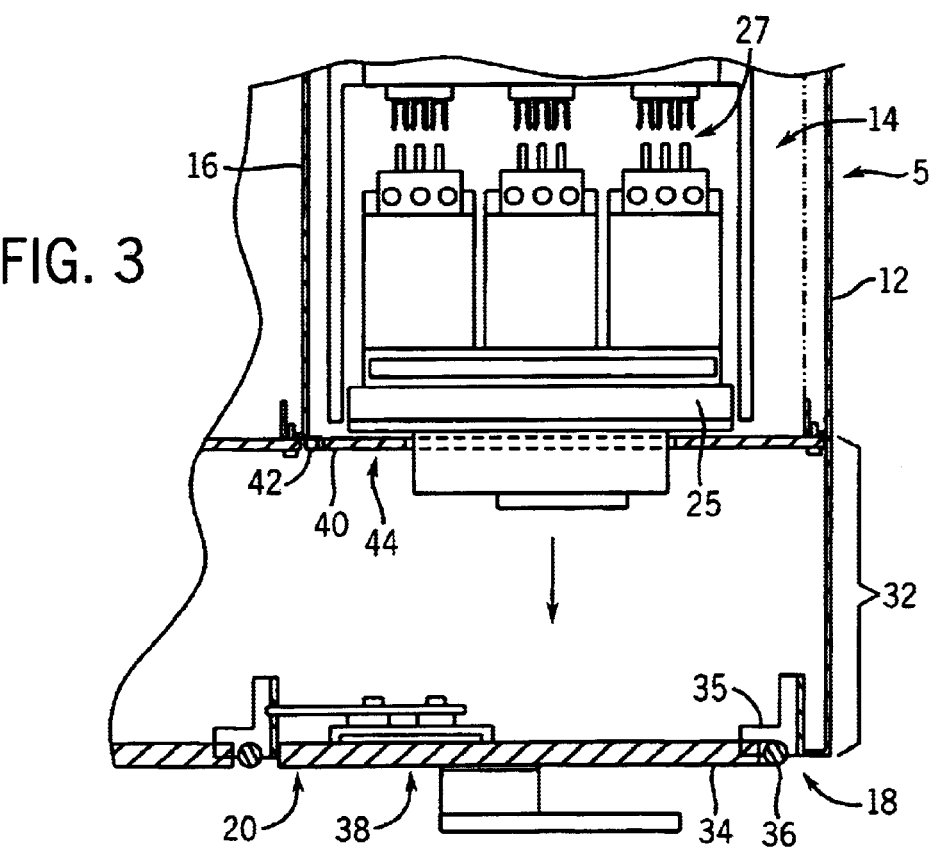
FIG. 3 is a partial sectional top view of the enclosure illustrated in FIG. 2, with the circuit breaker in a disconnected position and the exterior door in a closed position.

Referring to FIGS. 1–4, there is illustrated exemplary embodiments of the enclosure 5 with a door arrangement 30 for a switchgear enclosure.

The enclosure 5, also referred to as switchgear enclosure, comprises a structure 7 having a top panel 6 and a bottom panel 8, a back panel 10 and two opposing side panels 12 which define an interior space 14. A typical enclosure 5 is composed of metal such as steel but can also be aluminum and such other material as is appropriate for the attended application as defined by the manufacturer or user of the enclosure 5. The enclosure 5 is typically assembled by fastening the various panels together, for example by fasteners (screws, bolts, rivets) or welding.

The enclosure 5 is provided with a door arrangement 30 mounted on a front extension 32 which is coupled to the enclosure 5. The front extension can be coupled to an existing enclosure 5 by using fasteners, such as nuts and bolts or welding, or can be fabricated with the enclosure as an integral, single unit.

An exterior door 34 is pivotably mounted to the front extension by a door hinge or pivot 36. The door hinge 36 is mounted on an offset exterior door post 35 which may be attached to enclosure 5 at the interior framework 16. The exterior door 34 is configured to move from one of a closed position 38 and an open position 37 on one side 18 of the enclosure 5. A circuit breaker door 40 is pivotably mounted to an interior framework 16. The interior framework 16 is configured to support a circuit breaker 25 such as a draw-out circuit breaker. The interior framework 16 can be composed of any suitable material sufficient for its intended use such as steel or aluminum. The interior framework may or may not be coupled to the enclosure 5.

The breaker door 40 is configured to move from one of a closed position 44 and an open position 43 on another side 20 of the enclosure 5.

The exterior door 34 and the breaker door 40 are hinged opposite of each other, i.e., not on the same side of the enclosure 5. The exterior door 34 and the breaker door 40 can open to an angle Ø from the respective closed positions 38, 44. The angle Ø can be more than 90° and can also be at least 110°.

Figure 4:
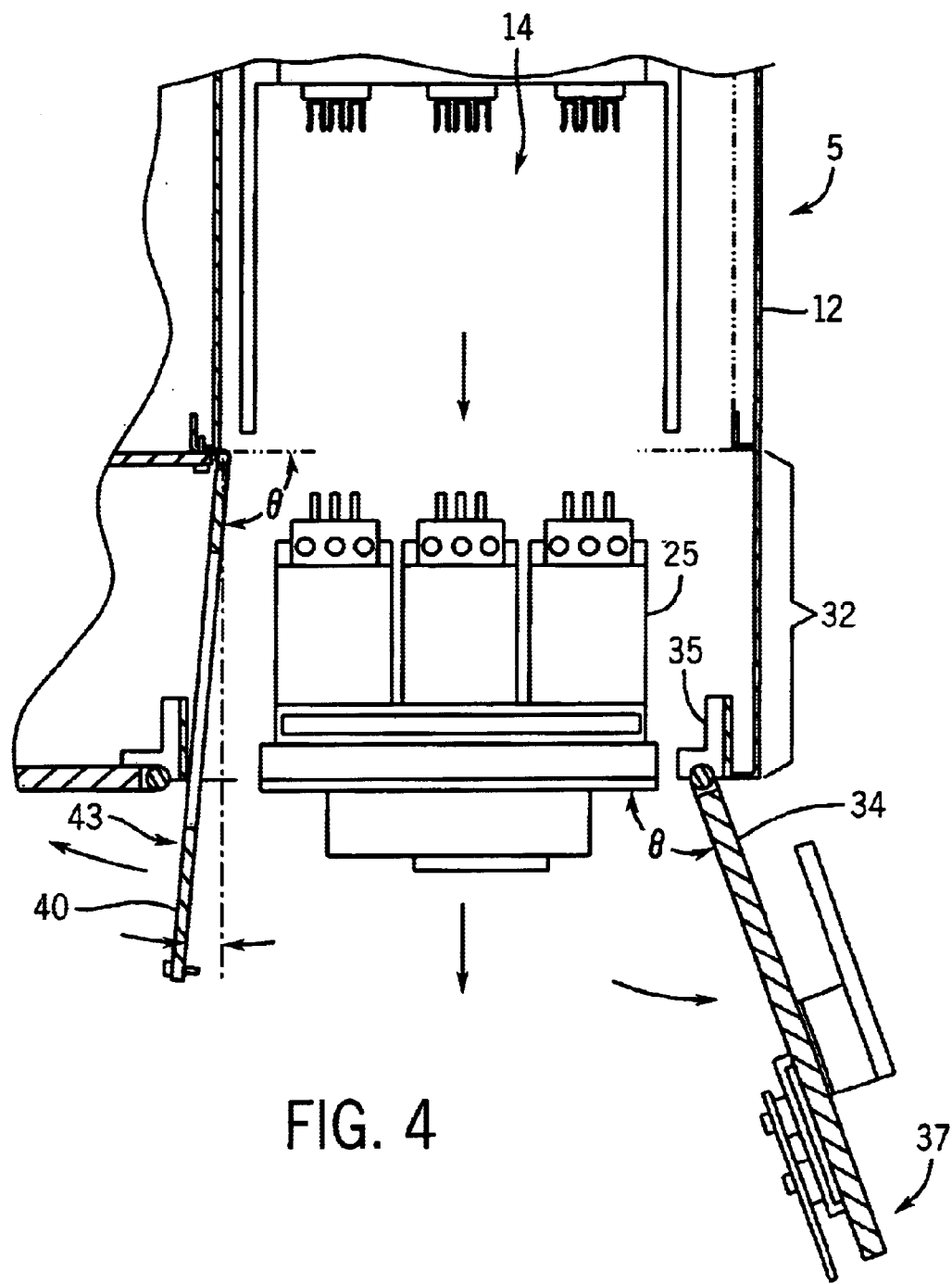
FIG. 4 is a partial top view of the enclosure illustrated in FIG. 2, with the circuit breaker being removed from the enclosure and the breaker door and exterior door in an open position.

The exterior door 34 can open from a closed position 38 to an open position 37 where 0 is at least 110° thereby allowing one of the installation and removal of the circuit breaker 25 (See FIG. 4). In such operation, the front extension 32 and offset exterior door post 35 allows the breaker door 40 to open clear of the exterior door 34. The exterior door 34 can be mounted in an off-set position on a frame post coupled to the enclosure 5. In addition, the circuit breaker 25 (can be a draw-out circuit breaker) is off-set to one side of the center line of the switchgear section to allow the exterior door and breaker door clearances described above. A typical off-set is one inch to the left (away from the exterior door frame post, See FIG. 4).

A combination of the front extension 32, the off-set of the circuit breaker (described above) and the off-set of the exterior door 34 allows the installation and removal of circuit breakers without the need to increase the section widths beyond their nominal widths which is typically 22 or 32 inches. Such arrangement allows for the placing of additional switchgear enclosure sections adjacent to each other without including width extensions in order to service, install or remove circuit breakers 25 or other electrical equipment in the enclosure 5.

In operation, the method of housing a circuit breaker 25 comprise the steps of providing a structure 7 having a top panel 6 coupled lo a bottom panel 8 with the back panel 10 coupled to two A opposing side panels 12. Such enclosure 5 defines an interior space 14. A framework 16 is provided and configured to support the circuit breaker 25 and is mounted in the interior space 14. The method further includes mounting this framework 16 in the interior space 14. A front extension 32 is provided either by coupling to an existing enclosure 5 or being formed integrally with the enclosure 5. An exterior door 34 is additionally provided and is configured to move from one of a closed position 38 and an open position 37. The method still further includes mounting the exterior door on one side 18 of the enclosure 5 with a door hinge or pivot 36. A breaker door 40 is provided and configured to move from one of a closed position 44 and an open position 43. The method further includes mounting the breaker door 40 on another side 20 of the enclosure 5 with the door hinge or pivot 42. Additionally the method includes the mounting of the circuit breaker 25 on the framework 16 with an offset away from the mounted exterior door 34.

The method of housing a circuit breaker 25 can also include the steps of moving the circuit breaker 25 to a disconnected position 27 and closing the exterior door 34 while the breaker 25 is in the disconnected position 27. While the circuit breaker 25 is in the connected position 26, the breaker door 40 and the external door 34 may be in either the open position 37, 43 or the closed position 38, 44 as determined by the user of the door arrangement 30.

It should be understood that the door arrangement 30 described herein is set up as viewed in the Figures with the breaker door hinged on the left side of the enclosure 5 and the exterior door hinged on the right side of the enclosure 5. However, it should be understood that the hinging of each door can be reversed, for example, the breaker door can be hinged on the right side of the enclosure 5 and the exterior door hinged on the left side of the enclosure 5. In the above described alternative configuration, the circuit breaker 25 would be off-set to the right of the exterior door 34 hinge 36.

Although the disclosed embodiments have been described in some detail, it should be understood that various changes, substitutions and alterations can be made to the embodiments without departing from their spirit and scope as defined in the appended claims.

What is claimed is:

1. A door arrangement for a switchgear enclosure, the enclosure having a top and bottom panel, a back panel and two opposing side panels and including an interior framework supporting a draw-out circuit breaker, the door arrangement comprising:

a front extension coupled to the enclosure;

an exterior door pivotally mounted to the front extension at an offset exterior door frame post and configured to move from one of a closed position and an open position on one side of the enclosure; and a breaker door pivotally mounted to the interior framework and configured to move from one of a closed position and an open position on another side of the enclosure and clear of the offset exterior door frame post.

2. The door arrangement of claim 1, wherein the exterior door and breaker door open to more than ninety degrees from the respective closed positions.

3. The door arrangement of claim 1, wherein the front extension allows the exterior door to be closed with the circuit breaker in a disconnected position.

4. The door arrangement of claim 1, wherein the front extension allows the breaker door to open clear of the exterior door.

5. The door arrangement of claim 1, wherein the exterior door opens to more than ninety degrees from the closed position to allow one of the installation and removal of the circuit breaker.

6. The door arrangement of claim 1, wherein the front extension is integrally formed with the enclosure.

7. A switchgear enclosure for a draw-out circuit breaker, the enclosure comprising:
   structure having a top panel coupled to a bottom panel with a back panel coupled to two opposing side panels defining an interior space;
   a framework mounted in the interior space of the structure and configured to support a circuit breaker;
   a front extension coupled to the structure;
   an exterior door pivotally mounted to the front extension at an offset exterior door frame post and configured to move from one of a closed position and an open position on one side of the structure; and
   a breaker door pivotally mounted to the interior frame work and configured to move from one of a closed position and an open position on another side of the structure and move clear of the offset exterior door frame post.

8. The switchgear enclosure of claim 7, wherein the exterior door and breaker door open to more than ninety degrees from the respective closed positions.

9. The switchgear enclosure of claim 7, wherein the front extension allows the exterior door to be closed with the circuit breaker in a disconnected position.

10. The switchgear enclosure of claim 7, wherein the front extension allows the breaker door to open clear of the exterior door.

11. The switchgear enclosure of claim 7, wherein the exterior door opens to more than ninety degrees from the closed position to allow one of the installation and removal of the circuit breaker.

12. The switchgear enclosure of claim 7, wherein the front extension is integrally formed with the structure.

13. A method of housing a circuit breaker, the method comprising the steps of:
   providing an enclosure defining an interior space;
   providing a framework configured to support the circuit breaker;
   mounting the framework in the interior space;
   providing a front extension;
   coupling the front extension to the enclosure;
   providing an exterior door configured to move from one of a closed position and an open position;
   providing an offset exterior door frame post;
   mounting the exterior door on the offset exterior door frame post at one side of the enclosure;
   providing a breaker door configured to move from one of a closed position and an open position;
   mounting the breaker door on another side of the enclosure;
   mounting the circuit breaker on the framework.

14. The method of housing a circuit breaker of claim 13, wherein the exterior door and breaker door open to more than ninety degrees from the respective closed positions.

15. The method of housing a circuit breaker of claim 13, wherein the front extension allows the exterior door to be closed with the circuit breaker in a disconnected position.

16. The method of housing a circuit breaker of claim 13, wherein the front extension and offset exterior door frame post allows the breaker door to open clear of the exterior door.

17. The method of housing a circuit breaker of claim 13, wherein the exterior door opens to more than ninety degrees from the closed position to allow one of the installation and removal of the circuit breaker.

18. The method of housing a circuit breaker of claim 13, wherein the front extension is integrally formed with the structure.

19. The method of housing a circuit breaker of claim 13, including the steps of moving the circuit breaker to a disconnected position and closing the exterior door while the breaker is in the disconnected position.

* * * * *